United States Patent [19]

Sinz

[11] Patent Number: 4,789,946
[45] Date of Patent: Dec. 6, 1988

[54] SYSTEM FOR MEASURING THE LEVEL OF FILLING

[75] Inventor: Wolfgang Sinz, Hofheim a. T., Fed. Rep. of Germany

[73] Assignee: VDO Adolf Schindling AG, Frankfurt am Main, Fed. Rep. of Germany

[21] Appl. No.: 944,838

[22] Filed: Dec. 22, 1986

[30] Foreign Application Priority Data

Jan. 16, 1986 [DE] Fed. Rep. of Germany ....... 3601100

[51] Int. Cl.⁴ .............................................. G01F 23/24
[52] U.S. Cl. .................................... 364/509; 340/618; 340/622; 73/295
[58] Field of Search ................ 364/509, 557; 340/603, 340/612, 616, 618, 622; 73/290 R, 291, 292, 295

[56] References Cited

U.S. PATENT DOCUMENTS

| | | | |
|---|---|---|---|
| 4,425,795 | 1/1984 | Albrecht et al. | 364/509 |
| 4,487,066 | 12/1984 | Pardi et al. | 364/509 |
| 4,513,616 | 4/1985 | Bezard et al. | 364/509 |
| 4,590,575 | 5/1986 | Empltt | 364/509 |
| 4,640,127 | 2/1987 | Schneider | 364/509 |
| 4,706,203 | 11/1987 | Ramsdale et al. | 364/509 |

Primary Examiner—Parshotam S. Lall
Assistant Examiner—Brian M. Mattson
Attorney, Agent, or Firm—Martin A. Farber

[57] ABSTRACT

In a system for measuring the level of filling, particularly in a fuel tank, having an analog probe which extends over the filling-level region and supplies measurement values which are analogs of the level of filling, there is furthermore provided a digital probe which supplies measurement values which change rapidly with the level of filling. Correction values are derived from a comparison of the measurement values of the digital probe and analog prove. The measurement values of the analog probe are corrected by means of the correction values and displayed. The probes are preferably formed of temperature-dependent resistors.

10 Claims, 3 Drawing Sheets

SYSTEM FOR MEASURING THE LEVEL OF FILLING

FIELD AND BACKGROUND OF THE INVENTION

The present invention relates to a system for measuring the level of filling, particularly in a fuel tank, having an analog probe which extends over the filling-level range and supplies measurement values which are analogs to the level of filling.

Various arrangements and systems are known for measuring the level of filling, particularly in fuel tanks. Thus, for instance, conductive paths of temperature-dependent resistance are applied to foils and acted on for a short time by a current. From the increase in resistance caused by the heating, the extent to which the conductive path is covered with fuel is then established. The electric value thus derived, which is analog to the filling level, can be fed to an indicating instrument or a digital display.

The foil which bears the conductive paths is arranged, in a suitably shaped holder, vertically in the fuel tank and extends over the entire filling-level region.

Due to various factors such as, in particular, the aging of the foil and the composition of the liquid to be measured, the sensitivity of such a filling-level measuring device varies with time. Furthermore, after it is produced it must be calibrated in order to compensate for manufacturing tolerances.

SUMMARY OF THE INVENTION

It is an object of the present invention to provide a system for measuring the level of filling in which a predetermined precision of measurement is retained for a long time.

According to the invention, there is also present a digital probe (2) that supplies measured values which change rapidly with the level of filling, correction values are derived from a comparison of the measured values of the digital probe (2) and the analog probe (3), and the measured values of the analog probe (3) are corrected by means of the correction values and displayed.

The system of the invention for measuring the level of filling has the advantage that changes in sensitivity are compensated for by a self-calibration of the system. Furthermore, an initial calibration takes place automatically upon the first filling of the tank, so that an expensive adjustment of the system at the factory can be dispensed with.

The probes (2, 3) can advantageously be formed of temperature-dependent resistors. The invention can, however, also be reduced to practice with the use of other probes, such as, for instance, capacitive probes.

One further development of the invention consists in the fact that the temperature-dependent resistors are formed of conductive layers which are applied to a support foil (1). One special embodiment consists therein that the analog probe (3) comprises a uniform temperature-dependent resistor which extends over the filling-level range and the digital probe (2) comprises a resistor which extends over the filling-level range and the length-dependent resistance of which is substantially greater at one or more selected values of filling level (fu, fo) than i the rest of the filling-level range. In this connection, two selective filling-level values (fo, fu) are provided in the upper and lower parts of the filling-level range respectively. In this way, two calibration values can be determined although only one additional wire is required in addition to the previous two wires between the probes and the electronic circuit.

The invention, to be sure, is also not limited to the digital probe being formed of a resistor and therefore of one conductive path. Thus, for instance, a conductive path can be provided for each selected filling level value.

Another further development of the invention resides in the fact that the conductive layer which forms the digital probe (2) is developed in meander shape at the selected filling-level values (fo, fu) and is of smaller cross section there than it is between the selected values. Furthermore, the digital probe (2) can be arranged on the support foil (1) parallel to the analog probe (3).

Another further development is characterized by the fact that the probes (2, 3) are repeatedly acted on briefly by a current, that the change in resistance resulting therefrom is measured, and that a new correction value is formed and stored whenever the measurement value of the digital probe (2) is within a range (fo, fu) which characterizes a selected filling-level value.

The system of the invention can be carried out to particular advantage with the use of a microcomputer which is provided for the evaluation and correction of the measurement values.

The invention permits of numerous variants.

BRIEF DESCRIPTION OF THE DRAWINGS

With the above and other objects and advantages in view, the present invention will become more clearly understood in connection with the detailed description of a preferred embodiment, when considered with the accompanying drawings, of which.

The same parts are provided with the same reference numbers in all figures.

DETAILED DESCRIPTION OF THE PREFERRED EMBODIMENTS

Figure 1:
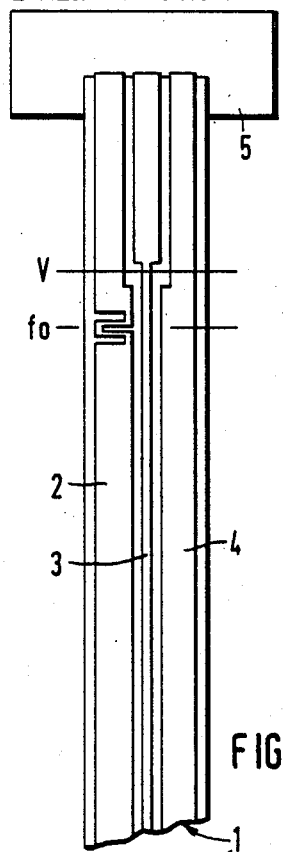
FIG. 1 is a schematic view of the probes and the evaluation unit.

In the arrangement shown in FIG. 1, three conductive paths 2, 3, 4 are applied to a foil 1. The foil extends over the vertical height of a fuel tank, not shown, and is held in guide parts, also not shown. At its upper end the foil, together with the conductors, extends out of the fuel tank is bent off at approximately a right angle and is introduced into the housing of an evaluation circuit 5.

One suitable material for the foil is "Kapton," while a copper-nickel alloy has proven suitable for the conductive paths. A useful value for the thickness of the conductive paths is 3 μm, while a few tenths of a millimeter enter into consideration as width in the sections of the digital probe which are to be heated.

The central conductive path 3 is developed as an analog probe, for which purpose it has a uniform cross section over the entire filling-level region to be measured (from L=empty to V=full). Above the filling-level region, the conductive path 3 is wider, so as to result in less heating due to the lower current density, as a result of which the measurement result will be in error as little as possible by changes in the resistance of this part.

The conductive path 2 has a large cross section over by far the greatest part of its length so that here also no disturbing heating occurs. Its cross section is substantially smaller only at the selected filling-level values fu and fo. In order that the resistance or change in resistance is also concentrated at these selected filling-level values, the conductive path 2 is developed in meander shape in the region of these filling-level values.

The selection of the filling-level values fo and fu, which serve for the calibration of the system according to the invention, is effected, inter alia, on basis of the following factors: For a calibration which is as accurate as possible, the greatest possible distance between these values is desirable. However, if they are too far apart from each other it may happen that, upon the actual operation of the automobile, the filling levels selected are reached only very rarely, if at all. Thus, for instance, the owner of the vehicle may regularly, as a matter of precaution, fill up already when a filling level of 20% has been reached. A recalibration of the system of the invention would then never be effected at a lower filling level of fu=10%.

The conductive path 4 serves as common return line for the conductive paths 2 and 3 which are developed as probes.

For the measurement of the level, the analog probe 3 and the digital probe 2 are each acted on briefly by a constant current. The increase in voltage which results during the flow of current is a measure of the increase in resistance and thus of that portion of the probe which is not covered with liquid.

Figure 2:
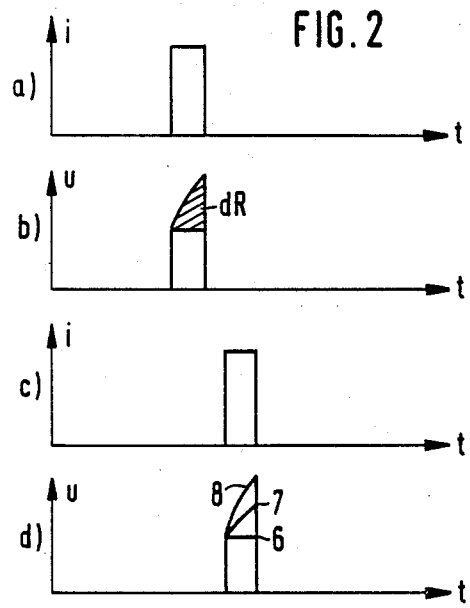
FIGS. 2a-2d are time graphs of the voltages and currents occurring on the probes.

The variations with time are shown in FIG. 2. FIG. 2a shows the change of the current i through the analog probe 3. A period of time of one second for the flow of current has proven suitable. The measurement can be repeated, for instance, every 30 seconds. In FIG. 2b, the variation of the voltage u at the analog probe is shown. The voltage jumps up suddenly upon the connecting of the current and then rises while the current remains constant, due to the heating of the conductive path 3.

If the conductive path is covered by liquid there is then obtained approximately the lower side of the hatched triangle while, when the fuel tank is empty and the entire conductive path 3 is surrounded by air, the increase in voltage lies at the upper tip of the hatched triangle. For the evaluation of the change in resistance, the resistance may be measured shortly before the disconnecting of the current 1. However, a large number of measurements may also be taken during the time of passage of the current, the results of which measurements are totaled so that the area of a triangle is available as measure of the level of filling.

Directly after the measurement by the analog probe 3, the digital probe 2 is acted on by current. In this way assurance is had that no substantial changes in the level of filling or other variables which affect the result of the measurement, such as, for instance, the temperature of the fuel, take place between the two measurements. During the current pulse shown in FIG. 2c the current 1 is constant, as in the case of the analog probe 3. The voltage u increases only slightly when the level of the liquid is above fo, as is indicated by the line 6 in FIG. 2d). If the level of the liquid is between the values fo and fu then there is an increase in accordance with the line 7, while if the level of the liquid is below fu there is a rapid rise in accordance with line 8.

If an increase which clearly lies between lines 6 and 7 or 7 and 8 occurs at the digital probe 2, then the liquid level is at fu or fo.

Figure 3:
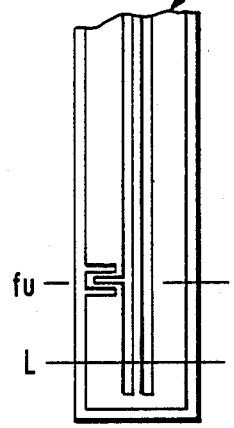
FIGS. 3a and 3b show the dependence of the measurement values of the probes on the level of filling.
Figure 3:
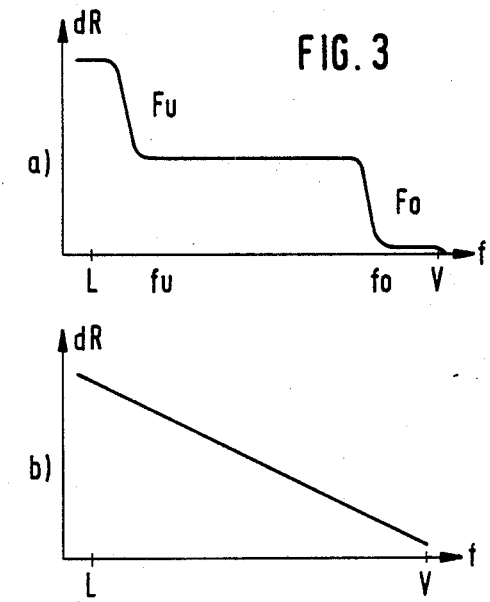

By way of further explanation, the changes in resistance dR are plotted in FIG. 3 as a function of the level of filling f, namely in FIG. 3a for the digital probe 2 and in FIG. 3b for the analog probe 3. While the change in resistance dR is greatest when the fuel tank is empty, it decreases suddenly in the immediate vicinity of the value fo and then remains approximately constant at half its value in the region between the values fu and fo. A further increase takes place at fo, whereafter the value dR remains very low up to the maximum level of filling V. If the signal of the digital probe is now fed to two window discriminators having the windows fu and fo, it can be concluded from the output signals of the window discriminators that the level of filling is at the selected values fu or fo. From the measurement with the analog probe 3 there is obtained the curve shown in FIG. 3b. Since the values fu and fo are determined precisely by the dimensions of the probe, it is possible, by a comparison of the measurement results of the analog probe with the filling-level values fo and fu to obtain correction values which can then be transferred to all values of the analog probe by the application of known arithmetic rules.

Figure 4:
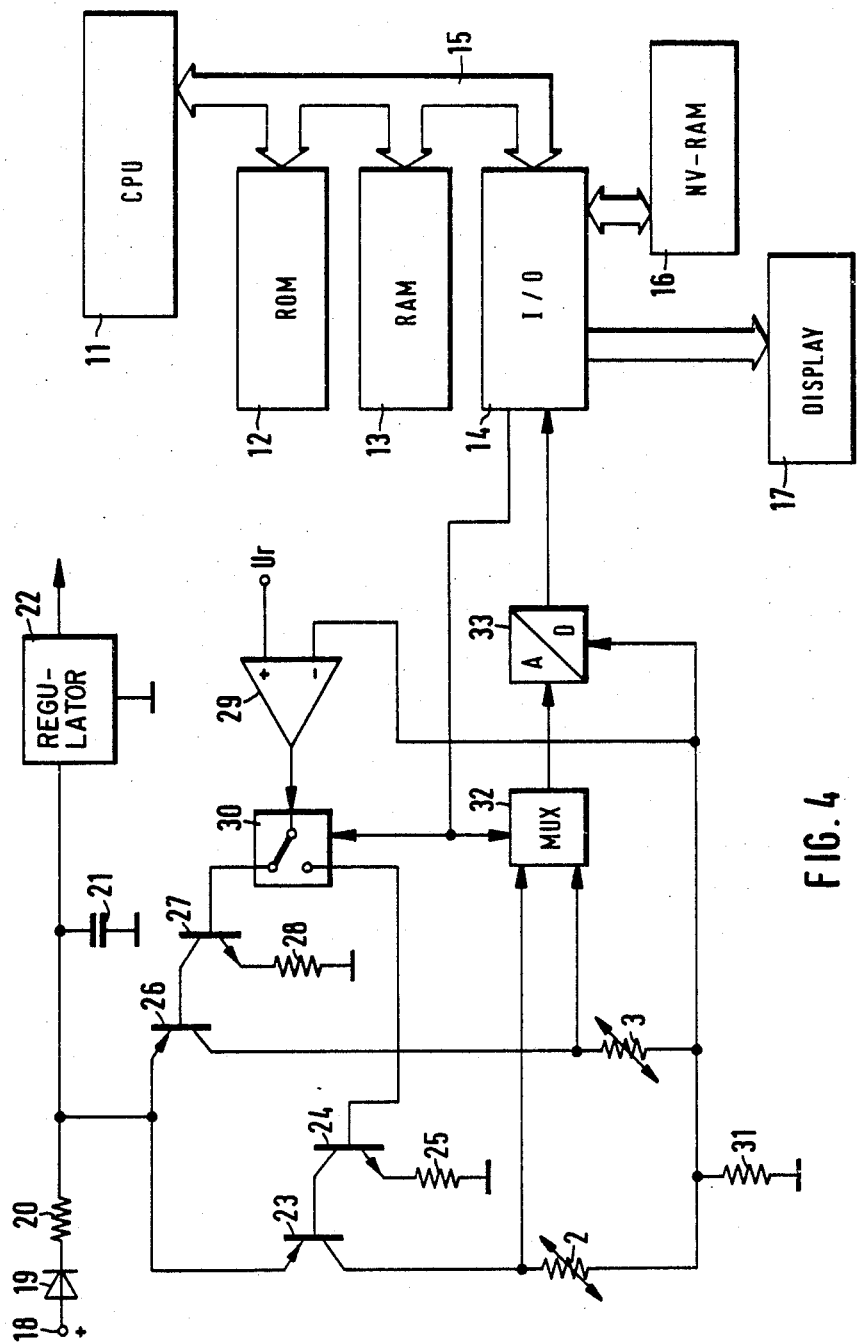
FIG. 4 is an electric evaluation circuit for the system of the invention.

FIG. 4 shows a circuit arrangement with which the evaluation already described in connection with FIGS. 2 and 3 can be carried out. It comprises a microcomputer the most important units of which are shown diagrammatically. These are the central unit 11, a program memory 12, a variable memory 13, an input/output device 14, and a bus system 15. A non-volatile memory 16 and a the display device 17, for instance a liquid crystal display are connected to the input/output device 14. The displays can, however, also be effected by an analog instrument to which the measured values are fed via a digital/analog converter. Furthermore, the feeding of the digital signals to an on-board computer which calculates, for instance, the consumption of fuel and/or the still remaining cruising range of the vehicle is possible. However, a microcomputer can also carry out both the functions for the system of the invention as well as further functions of a so-called on-board computer.

For the supplying of the current, the terminal 18 of the circuit is connected to the positive pole of the battery of the vehicle. A diode 19 serves as protection against reversal of polarity while a resistor 20 and a capacitor 21 form a filter. In order to exclude errors in measurement due to variations in the battery voltage, a stabilized operating voltage for the individual assemblies of the circuit is produced by means of a stabilizing circuit 22. Only the probes 2 and 3 are not connected to the stabilized operating voltage since the current through the probes is in any event regulated.

The transistors 23 and 24 as well as the resistor 25 serve as sources of constant current for the digital probe 2. Similarly, transistors 26 and 27 and a resistor 28 are provided as sources of constant current for the analog probe 3. Since the two probes are acted on one after the other by current, only one control circuit and one analog/digital converter each are provided both for the regulating of this current and for the measurement of the voltage drops on the probes.

The control circuit is formed of a difference amplifier 29, a switch 30, the aforementioned sources of constant current, the probes 2, 3, and a resistor 31. Over the resistor 31 there is a voltage drop which is proportional to the instantaneous current and is fed as actual value to the inverting input of the difference amplifier 29. The noninverting input of the difference amplifier 29 is acted on by a constant reference voltage Ur. The output voltage of the difference amplifier 29 is fed by means of the switch 30 alternately to the constant-current sources for the digital probe 2 and the analog probe 3. For this purpose, the switch 30 is controlled in suitable manner by the microcomputer.

A multiplexer 32 connects in each case one of the probes 2, 3 with the input of an analog/digital converter 33 in the same connection as the switch 30. The voltage drop on the resistor 31 is fed as reference voltage to the analog/digital converter 33. In this way, assurance is had that in each case only the voltage drops on the probes 2 and 3 are fed to the analog/digital converter 33, and input as digital values in the microcomputer.

Figure 5:
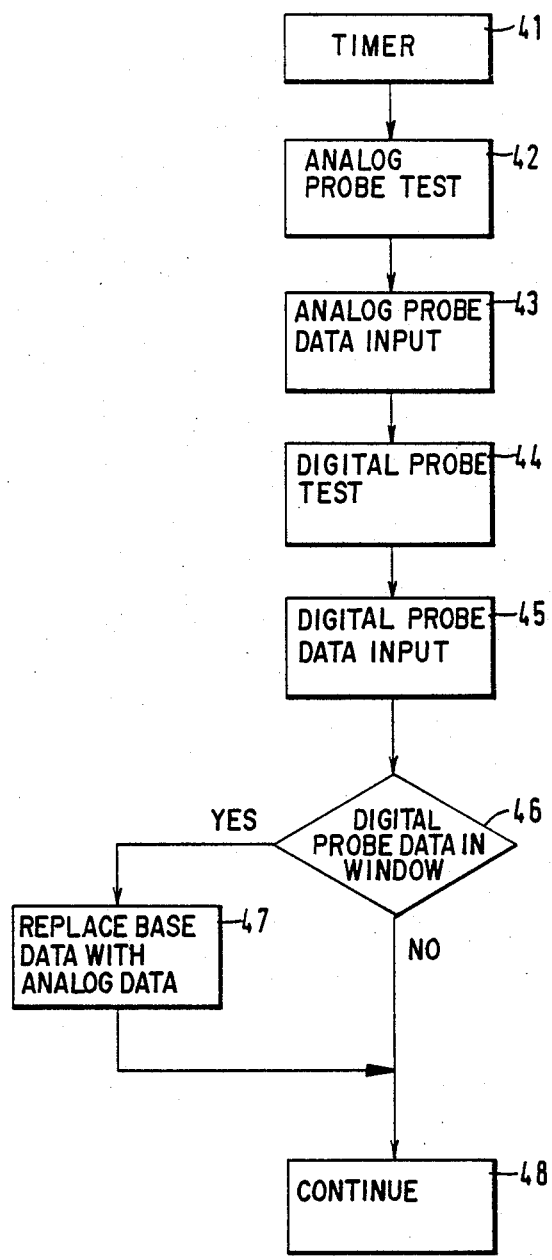
FIG. 5 shows, in simplified form, a portion of a flowchart of the program stored in the microcomputer.

FIG. 5 shows a part of the program stored in the program memory 12. The time control, inter alia, of the switch 30 and of the multiplexer 32, is established in the part 41 of the program. This is followed at 42 by the function testing of the analog probe, which consists, for instance, in measuring the resistance of the analog probe with extremely small current. Thereupon the measurement data are taken up at 43, as has been described in connection with FIGS. 2 and 3. In the program part 44, function testing of the digital probe is carried out, whereupon the data from the digital probe are taken up in the program part 45. At the branch 46 it is tested whether the measurement data ascertained are present in one of the windows fo and fu (FIG. 3). If so, then the base data are replaced by analog data at 47. If the measurement values of the digital probe are not present in one of the windows then the base data remain unchanged and the program is continued at 48.

The foil 1 is fabricated of a flexible electrically insulating material such as a polycarbonate, one such material being commercially available under the aforementioned name "Kapton".

I claim:

1. A system for measuring a level of fluid in a vessel particularly in a fuel tank, the system including an analog probe which extends within the vessel over a range of fluid level and supplies measurement signals of the fluid level; and wherein the system further comprises a digital probe disposed in said vessel for supplying measurement signals which can change rapidly in accordance with fluid level, the analog probe extending in the vessel over a range of fluid level at least as great as a range of fluid level extension of the digital probe to permit measurement of a predetermined fluid level by both of said probes;

an electronic circuit means coupled to said probes for comparing signals of the respective probes to provide correction values derived from a comparison of the measurement signals of the digital probe and the analog probe, said electronic circuit noting when a level measurement by said digital probe falls within a window of level measurement by said analog probe; and wherein said circuit means corrects the measurement signals of the analog probe by means of the correction values for display of liquid level, a correction value being obtained from said digital probe for a level measurement falling within a window.

2. A system according to claim 1 wherein said probes comprise temperature-dependent resistors.

3. A system according to claim 2 further comprising a support foil; and wherein said temperature-dependent resistors are formed of conductive layers disposed on said support foil.

4. A system according to claim 3, wherein said analog probe comprises a uniform temperature-dependent resistor which extends over the fluid-level range; and said digital probe comprises a resistor which extends over the fluid-level range, resistance of said digital probe being dependent on the length thereof, incremental values of resistance being substantially greater than an average resistivity at one or more selected values of fluid level.

5. A system according to claim 4 wherein two selective fluid-level values are provided in upper and lower parts of the fluid-level range, respectively, to establish two calibration values; there being one signal-return wire for the two probes and two individual wires coupled to respective ones of the probes to make connection between the probes and said electronic circuit.

6. A system according to claim 4 wherein said digital probe comprises a plurality of conductive paths, there being one conductive path provided for each of a plurality of selected values of fluid level.

7. A system according to claim 6 wherein said digital probe includes a conductive layer developed in meander shape at the selected values of fluid level, and is of smaller cross section there than it is between the selected values.

8. A system according to claim 7 wherein said digital probe is disposed on said support foil parallel to said analog probe.

9. A system according to claim 2, wherein said circuit means comprises a current source; and said probes are repeatedly acted on briefly by current of said source, a change in resistance of said probes resulting from said current being measured; and a new correction value is formed and stored by said circuit means whenever a measurement signal of the digital probe is within a range which characterizes a selected value of fluid level.

10. A system according to claim 9, wherein said circuit means is a microcomputer which is programmed for evaluation and correction of the measurement signals.

* * * * *